US006125746A

United States Patent [19]

Eggleton

[11] Patent Number: 6,125,746

[45] Date of Patent: Oct. 3, 2000

[54] STAMP APPARATUS

[76] Inventor: Richard C. Eggleton, 8 Blue Lagoon Court, Nerang, Queensland, Australia

[21] Appl. No.: 09/315,663

[22] Filed: May 20, 1999

[51] Int. Cl.$^{7}$ .............................. B29C 59/02; E01C 23/02

[52] U.S. Cl. ............................ 101/3.1; 425/385; 425/458

[58] Field of Search .................................. 101/3.1, 35, 4, 101/405, DIG. 36, 368; 425/470, 385, 458; 264/293

[56] References Cited

U.S. PATENT DOCUMENTS

| | | | |
|---|---|---|---|
| 515,919 | 5/1894 | Maurer | 425/385 |
| 729,633 | 6/1903 | Mittler | 101/368 |
| 1,426,067 | 8/1922 | Hill | 101/4 |
| 2,402,651 | 6/1946 | Manwaring | 101/368 |
| 2,621,419 | 12/1952 | Wold | 101/368 |
| 5,487,656 | 1/1996 | Kaitanjian | 425/385 |

*Primary Examiner*—Stephen R. Funk
*Attorney, Agent, or Firm*—Parson & Goltry; Michael W. Goltry; Robert A. Parson

[57] ABSTRACT

A stamp for forming an impression into hardenable material and an elongate body carried by the stamp for movement between retracted and extended conditions for measuring the distance between impressions.

2 Claims, 1 Drawing Sheet

STAMP APPARATUS

FIELD OF THE INVENTION

This invention relates to apparatus for manipulating hardenable material and, more particularly, to apparatus for forming impressions into hardenable material.

BACKGROUND OF THE INVENTION

A curb is a border that forms an enclosing or dividing framework or part of a gutter along the edge of a street. Although curbing, especially concrete curbing, exhibits important structural and functional characteristics, its aesthetic appeal is now beginning to prove desirable in landscape architecture. With the availability of concrete dies and specially designed curb forming devices, concrete curbing can be extruded in a wide variety of colors and shapes. To further enhance the aesthetic appear of concrete curbing, skilled artisans are also beginning to form impressions into the extruded curbing before it hardens. These impressions are normally formed with specially designed stamp apparatus that exhibit footprints having a wide variety of shapes and forms for forming desired impressions. Although known such stamp apparatus prove adequate, most are expensive and difficult and cumbersome to use. Because of these and other deficiencies in the art, the continued need for new and useful improvements is evident.

Accordingly, it would be highly desirable to provide improved apparatus for forming decorative impressions into hardenable material.

It is a purpose of the invention to provide new and improved apparatus that is easy to construct.

It is another purpose of the invention to provide new and improved apparatus that is easy to use.

It is still another purpose of the invention to provide new and improved apparatus that is inexpensive.

It is a further provision of the invention to provided new and improved apparatus for forming decorative impressions into hardenable material that includes a measuring device for accurately measuring the distance between impressions.

It is still a further provision of the invention to provided skilled artisans with apparatus for accurately decorating extruded concrete curbing with decorative impressions.

SUMMARY OF THE INVENTION

The above problems and others are at least partially solved and the above purposes and others realized in new and improved apparatus comprising a handled body for forming an impression into hardenable material and an elongate body carried by the handled body for movement between retracted and extended conditions for measuring the distance between adjacent impressions. The elongate body is preferably mounted with a guide for movement in a reciprocally linear direction between the retracted and extended conditions. The guide supports a locking element for movement in a reciprocally linear direction for placing the elongate body into locked and unlocked conditions.

BRIEF DESCRIPTION OF THE DRAWINGS

The foregoing and further and more specific objects and advantages of the invention will become readily apparent to those skilled in the art from the following detailed description thereof taken in conjunction with the drawings in which.

DETAILED DESCRIPTION OF A PREFERRED EMBODIMENT

The present invention provides, among other things, new and improved apparatus for forming impressions into hardenable material and for measuring the distance between impressions. The ensuing embodiment is easy to construct, easy to use and proves exemplary for providing the skilled artisan with a means of accurately forming decorative impressions into hardenable material and, more particularly, into newly extruded concrete curbing.

Figure 1:
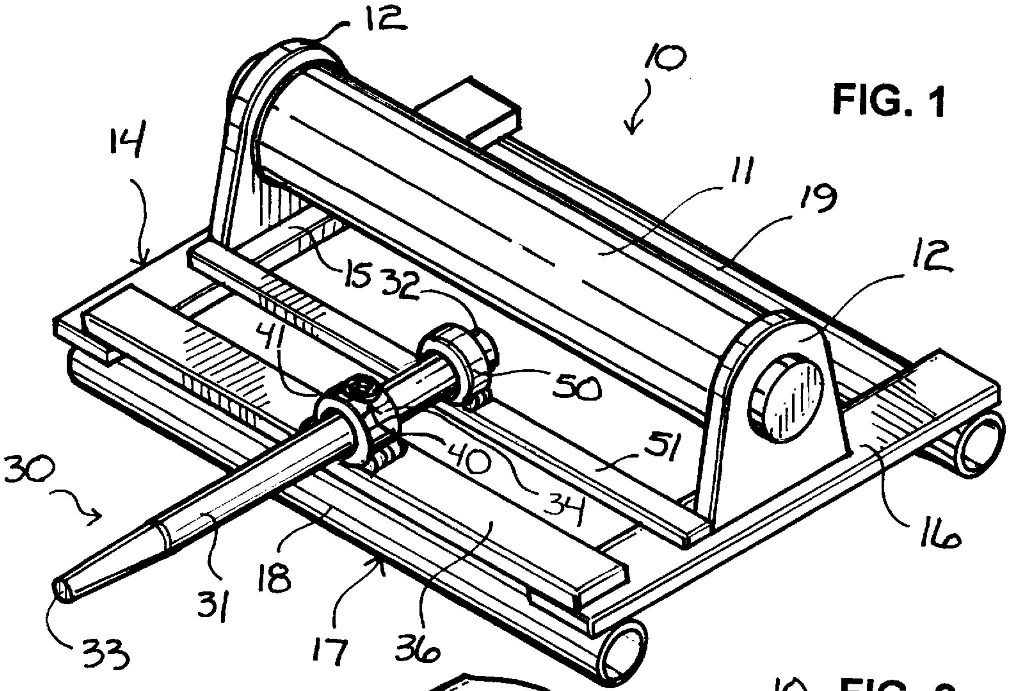
FIG. 1 is a perspective view of apparatus for forming impressions into hardenable material and for measuring the distance between impressions.

Turning now to the drawings, in which like reference characters indicate corresponding elements throughout the several views, FIG. 1 illustrates a perspective view of apparatus or stamp 10 for forming impressions into hardenable material and for measuring the distance between impressions. The ensuing embodiment is preferably constructed of aluminum, plastic, steel or other substantially rigid material. Except when indicated otherwise, the various structural components of the invention may be welded, glued, riveted or otherwise fixed together by other similar fastening mechanisms.

Figure 2:
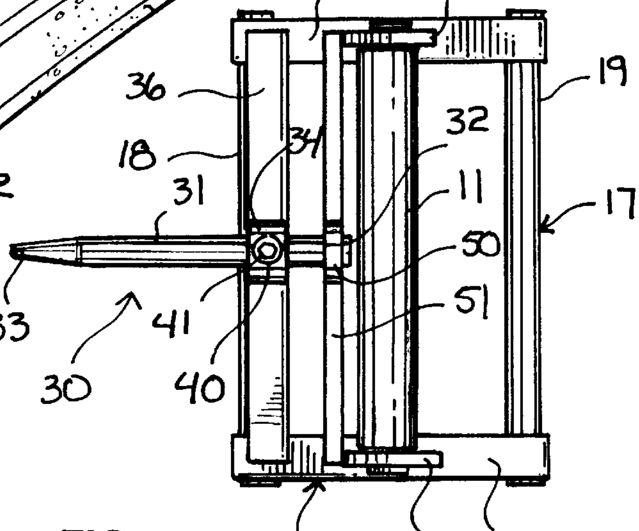
FIG. 2 is a top plan view of the apparatus of FIG. 1.

With additional reference to FIG. 2, apparatus 10 is comprised of a handle 11 supported by a bracket 12 carried by a body or framework 14. In this embodiment, framework 14 includes elongate support members 15 and 16 disposed in spaced-apart and substantially parallel relation. Framework 14 supports a footprint or stamp structure 17 opposing handle 11. In this embodiment, stamp structure 17 includes elongate stamp elements 18 and 19 each supported adjacent free ends of elongate support members 15 and 16 in spaced-apart and substantially parallel relation.

In operation, a user may grasp handle 11, such as with a hand, and, by applying a compressive force, direct and force stamp structure 17 into a newly extruded curb 20 of concrete or other form of hardenable material and, in so doing, form an impression 21 of the stamp structure 17 into the curb 20. Those of ordinary skill will readily appreciate that stamp structure 17 may be provided in a potentially infinite variety of shapes and structural forms suitable for providing any desired impression when forced or stamped into hardenable material. Furthermore, handle 11 and framework 14 may also be provided in a potentially infinite variety of shapes and structural forms suitable for allowing apparatus 10 to be grasped and for providing support for stamp structure 17.

Figure 3:
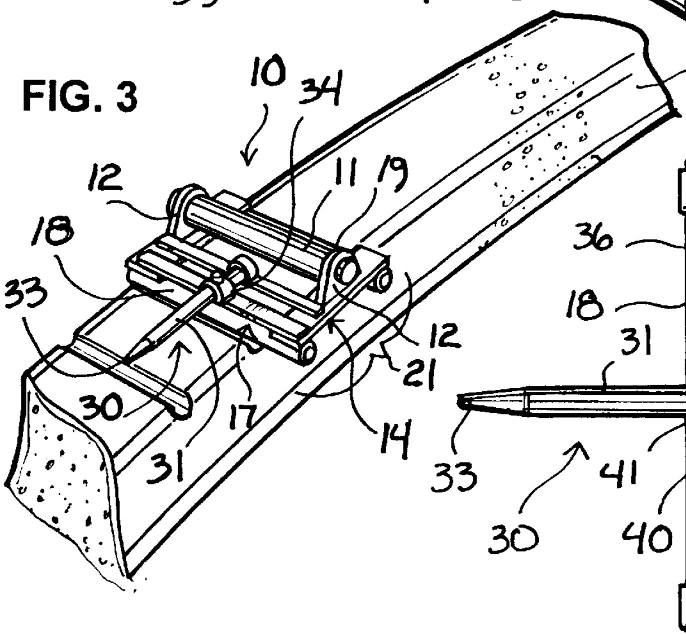
FIG. 3 is a perspective view of the apparatus of FIG. 1 shown as it would appear forming an impression into hardenable material.

As shown in FIGS. 1–3, apparatus 10 includes measuring apparatus 30 comprising, in this specific embodiment, an elongate body 31. Regarding FIG. 1, elongate body 31 includes an inner end 32 and an outer end 33, and is carried in a guide or sleeve 34 for movement in a reciprocally linear direction between a retracted condition and an extended condition. This movement defines a retracted condition or position of outer end 33 toward stamp structure 17 and an extended condition or position of outer end 33 away from stamp structure 17. Guide 34 is mounted intermediate the elongate support members 15 and 16 to an elongate structural support 36 fixed adjacent free ends of the elongate support members 15 and 16. Guide 34 could be mounted directly to one or the other of elongate support members 15 and 16 if desired. Guide 34 carries a locking element 40 movable substantially in a reciprocally linear direction in opposition to elongate body 31 for locking elongate body 31 against guide 34 in a locked condition and for releasing elongate body 31 from guide 34 in an unlocked condition. This allows elongate body 31 to be moved reciprocally between its retracted and extended conditions in the unlocked condition and fixed at and between its retracted and extended conditions in the locked condition. In this embodiment, locking element 40 comprises a threaded bolt 41 movable in reciprocal directions upon application of a rotational force. Of course, other suitable structure may be employed with guide 34 for placing elongate body 31 in a locked and unlocked condition.

Figure 4:
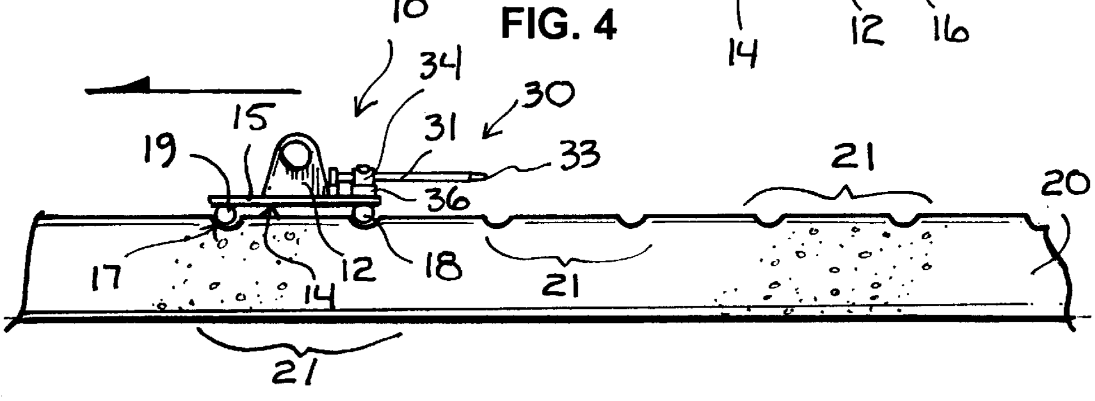
FIG. 4 is a front elevational view of the apparatus of FIG. 1 shown as it would appear forming an impression into hardenable material.

The importance of measuring apparatus 30 is shown in FIG. 4. FIG. 4 shows a plurality of impressions 21 formed into curb 20 with apparatus 10 at spaced intervals. The space between each impression may be efficiently and easily controlled with measuring apparatus 30. In this regard, after adjusting outer end 33 of elongate body 31 into its retracted condition, its extended condition or at a selected position between its retracted and extended conditions, outer end 33 may be directed toward an adjacent impression 21 for accurately measuring the distance between the adjacent impression 21 and the next impression 21 as substantially shown. As a result, the distance between adjacent impressions 21 may be accurately determined and controlled for allowing a skilled artisan to form accurately spaced-apart impressions into curb 20.

The present invention has been described above with reference to a preferred embodiment. However, those skilled in the art will recognize that changes and modifications may be made in the described embodiments without departing from the nature and scope of the present invention. For instance, FIG. 1 illustrates a secondary guide or sleeve 50 fixed to a secondary elongate structural support 51 fixed to elongate support members 15 and 16 intermediate their free ends. Secondary guide 50 is spaced from and opposes guide 34, receives elongate body 31 and allows it to reciprocate therethrough. Secondary guide 50 may be provided as additional support for elongate body 30 if desired.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Apparatus for forming impressions into hardenable material and for measuring the distance between impressions comprising:

a framework having stamp structure;

a guide supported by the framework at the stamp structure;

an elongate body having a free end, the elongate body carried by the guide for movement along a reciprocally linear path between a retracted condition and an extended condition for moving the free end between a retracted position toward the stamp structure and an extended position away from the stamp structure; and a locking element carried by the guide for movement between first and second positions for placing the elongate body into locked and unlocked conditions.

2. Apparatus for forming impressions into hardenable material and for measuring the distance between impressions comprising:

a framework having opposing ends, a handle carried by one of the opposing ends and stamp structure carried by the other of the opposing ends;

a guide supported by the framework proximate the stamp structure;

an elongate body having a free end, the elongate body carried by the guide for movement along a reciprocally linear path between a retracted condition and an extended condition for moving the free end between a retracted position toward the stamp structure and an extended position away from the stamp structure; and a locking element carried by the guide for movement between first and second positions for placing the elongate body into locked and unlocked conditions.

* * * * *